United States Patent [19]
Wang

[11] Patent Number: 6,112,279
[45] Date of Patent: Aug. 29, 2000

[54] VIRTUAL WEB CACHING SYSTEM

[75] Inventor: Zheng Wang, Middletown, N.J.

[73] Assignee: Lucent Technologies, Inc., Murray Hill, N.J.

[21] Appl. No.: 09/052,284

[22] Filed: Mar. 31, 1998

[51] Int. Cl.[7] .............................. G06F 12/00; G06F 13/00
[52] U.S. Cl. ............................... 711/119; 711/3; 709/203; 709/219
[58] Field of Search ................................... 709/203, 219; 711/3, 119

[56] References Cited

U.S. PATENT DOCUMENTS 5,774,660   6/1998   Brendel et al. ........................ 709/201

*Primary Examiner*—Jack A. Lane
*Attorney, Agent, or Firm*—Henry T. Brendzel

[57] ABSTRACT

In an arrangement where a plurality of cache servers are interconnected to form a virtual cache, each cache server includes a selection module and a caching module. The selection module determines whether the cache server can service an incoming request for information, whether the request ought to be directed to another one of the cache servers, or whether the request be routed to the site from whence the information is requested. In making this determination, in accordance with one embodiment, the module consults a table that associates sites or/and sub-sites with specific ones of the cache servers. In another embodiment, the determination is made by translating the address of the site, or sub-site, or web page that is requested; for example, with a hash function. The caching module determines whether a request for information from a particular site will be cached in the cache server of the caching module, if it is not already being cached by one of the cache servers. The determinations made by the caching module comport with the determinations made by the selection module.

32 Claims, 2 Drawing Sheets

VIRTUAL WEB CACHING SYSTEM

BACKGROUND OF THE INVENTION

This invention relates to web cache servers.

One of the major problems that needs to be tackled as the World Wide Web continues its exponential growth is the severe congestion that Web users are experiencing. Although increasing network bandwidth would help, as more information services are moved onto the Web the demand for bandwidth is likely to continue to outstrip supply for the foreseeable future.

Caching has been widely recognized as one of the solutions to this congestion problem, because caching can substantially reduce latency and improve bandwidth efficiency. With extensive use of caching, along with pre-fetching, replication and mirroring, significant traffic reduction can be achieved on bottleneck links.

Caching may take place at various points between a user and the data source. For example, most modern browsers have built-in caching which keeps recently accessed web pages in the PC itself. Proxy caching was incorporated in the CERN httpd, which is one of the oldest Web servers. A CERN server can also chain to another caching server. Most second-generation Web servers, such as Apache, Jigsaw, and NetSite support similar caching functions. A comprehensive report on Web caching can be found in A. Cormack, *Web Caching*, Technical Report, University of Wales, UK, September 1996.

Another important work on caching, known as the Harvest Cache, is described by A. Chankhunthod, P. Danzig, C. Neerdales, M. Schwartz, and K. Worrell, in *A hierarchical Internet object cache*, Usenix'96, January 1996. The Harvest cache possesses a hierarchical caching architecture in which cache servers that are positioned at selected points of a large network co-operate with each other using Internet Cache Protocol (ICP). When A Harvest cache server receives a request for an object that is not cached locally, the server queries its neighbors and hierarchical parents to find the sought object. If that object is not found, the cache server directs the request to the object's source.

After the Harvest project ended August 1996, the development of the Harvest cache has been carried out by the Harvest Developers Group as a commercial product, and by National Laboratory for Advanced Networking Research (NLANR). A report on this project can be found in http://www.nlanr.net/Cache/. A similar system was proposed by R. Malpani, J. Lorch, D. Berger, in *Making World Wide Web Caching Servers Cooperate*, 4th International World Wide Web Conference, Boston, USA, December 1995, where multicasting is used for querying neighbor servers.

Although the Harvest cache represents an advance in the art it, nevertheless, has a number of problems.

One problem is that for each local cache "MISS", the cache server has to send a query message to all its neighbors and parents, and receive a reply from each of them. This represents an overhead of about 200 bytes per neighbor or parent. In a large Harvest cache system with many cache servers or a deep hierarchy, this overhead is high, and represents a particularly inefficient use of resources when the requested object is small. Additionally, the request/reply interaction introduces some latency during the resolution.

Another problem of the Harvest cache is that the search for a cached object is done in a distributed fashion. For each query, all neighbors and parents have to search their caches in parallel, no matter whether the results is a "HIT" or a "MISS" (and a "MISS" is certain for all but, perhaps, one server). Since a final "MISS" cannot be concluded until the slowest cache server responds or the waiting timer expires, a low hit rate at any one of the cache servers slows down the entire system.

Still another problem of the Harvest cache is that there is no explicit cache placement policy. An object may be cached at any of the cache servers. This lack of policy has a number of implications. For example, objects from a same Web site may spread over all cache servers, which forces all cache servers to be searched in order to find out whether an object is cached or not.

SUMMARY

An improved arrangement is realized by interconnecting a plurality of cache servers, for example, with high speed and high capacity connection, with at least some of the cache servers being connected to a data network, e.g., the Internet. Each cache server includes a selection module that determines whether the cache server can service an incoming request for information, whether the request ought to be directed to another one of the cache servers, or whether the request be routed to the site from whence the information is requested. In making this determination, in accordance with one embodiment, the module consults a table that associates sites or/and sub-sites with specific ones of the cache servers. In another embodiment, the determination is made by translating the address of the site, or sub-site, or web page that is requested; for example, with a hash function.

The policy for placement of information for particular cache servers is cooperatively arrived within an information caching module at by the plurality of cache servers to comport with the selection module. Accordingly, for example, in the embodiment where a hash function is used to look for some site, the same hash function is used to determine which cache server is to cache information from a given site. In the embodiment where a table is used, various techniques can be employed to optimize operations, such as, for example, caching information at a server that is physically close to the community of users of the cached information.

DETAILED DESCRIPTION

The cache arrangement disclosed herein is characterized by two attributes: an efficient search policy, and the existence of a placement policy that works well with the search policy. The search policy disclosed herein provides that a data request which arrives at a cache is either served by the cache (because the requested data is found in the cache), is directed to a cache that may contain that data, or is directed to the source of the requested data. The specific placement policy is not critical, as long as some policy exists. Of course, some placement policies are better than others.

The following discloses a number of embodiments that have different placement policies. These embodiments are merely illustrative, and other embodiments can easily suggest themselves to a skilled artisan.

Figure 1:
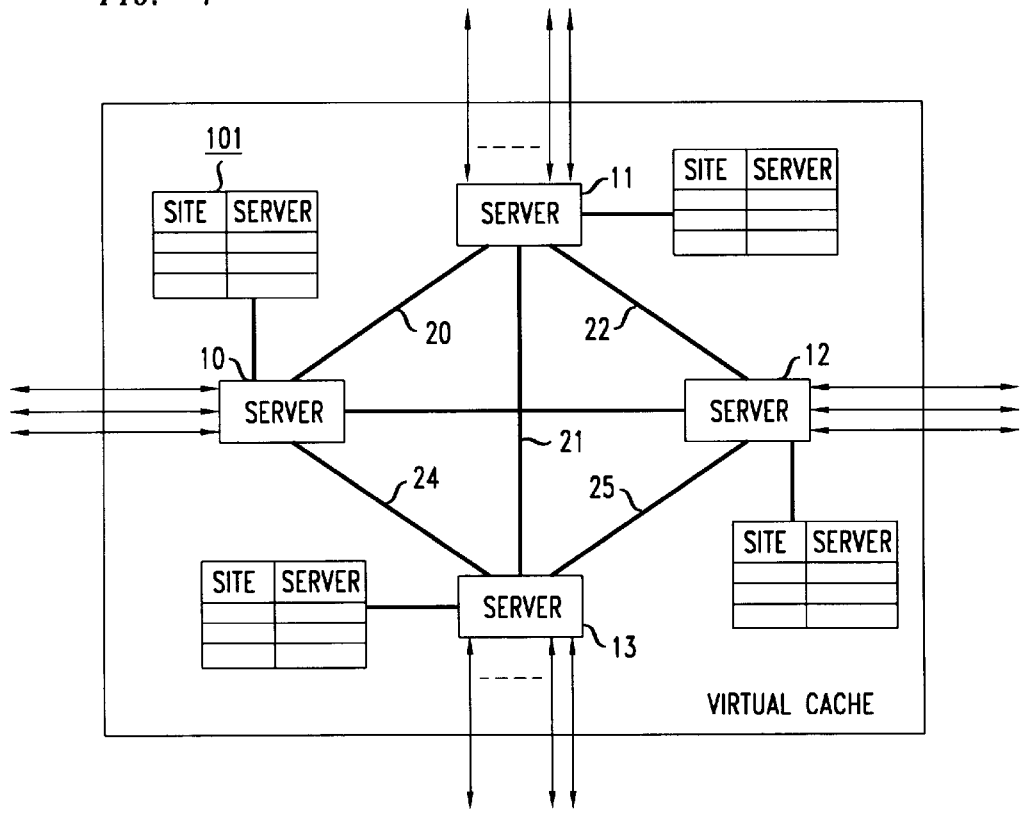
FIG. 1 presents a block diagram of a virtual cache server in accordance with one embodiment of this invention.
Figure 2:
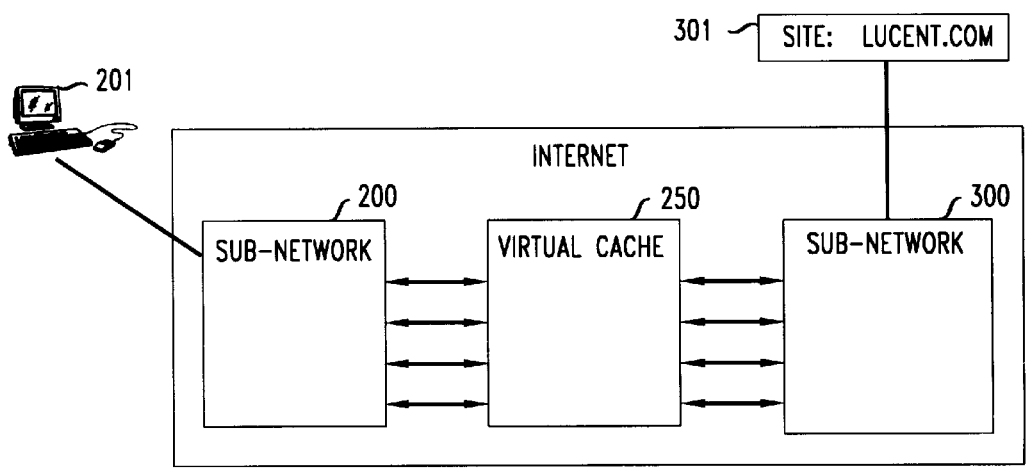
FIG. 2 illustrates the division of the Internet network by the interjection of a virtual cache server.

FIG. 1 presents a block diagram of an arrangement in accord with the principles disclosed herein. Illustratively, four servers are shown (10, 11, 12, and 13) which are interconnected by high speed, high capacity, links 20–25. To the outside "world", the FIG. 1 arrangement appears like a single virtual cache. It is expected that this virtual cache arrangement will serve some select local area in a manner not unlike that of a LAN. That is, the plurality of interconnected networks that collectively are known as "the Internet network" might have a number of virtual caches like the one depicted in FIG. 1. Such caches might be dispersed throughout the Internet network. Relative to a given virtual cache, however, the Internet network can be thought of being divided into a subnet of the Internet network to which access is gained by going through the virtual cache of FIG. 1, and the remainder of the Internet network (also a sub-network). This is illustrated in FIG. 2 with sub-nets 200 and 300, and virtual cache 250 coupling the two sub-nets. When an Internet user 201 requests an object, such as a web page, from a site in sub-net 300, for example, the web page "www.lucent.com/welcome.html/" from site http://www.lucent.com (301), the request is routed to virtual cache 250. When the request arrives at virtual cache 250, the cache satisfies the request, if it can, or routes the request to site http://www.lucent.com itself. As an aside, in the context of this disclosure, a "site" is represented by an http address that does not include an appendage of the form "/aaa". Accordingly, "http://www.lucent.com" represents a site. A site can have directories, and subdirectories, and both the directories and the subdirectories can have files, which represent web pages. The address "http://www.lucent.com/welcome.html/" is the address of a web page (because it was so stated). The address format of a directory, or a subdirectory of a site does not differ from that of a web page. Nevertheless, it should be recognized that there is a difference between a sub-site (directories and subdirectories) and a web page.

Figure 3:
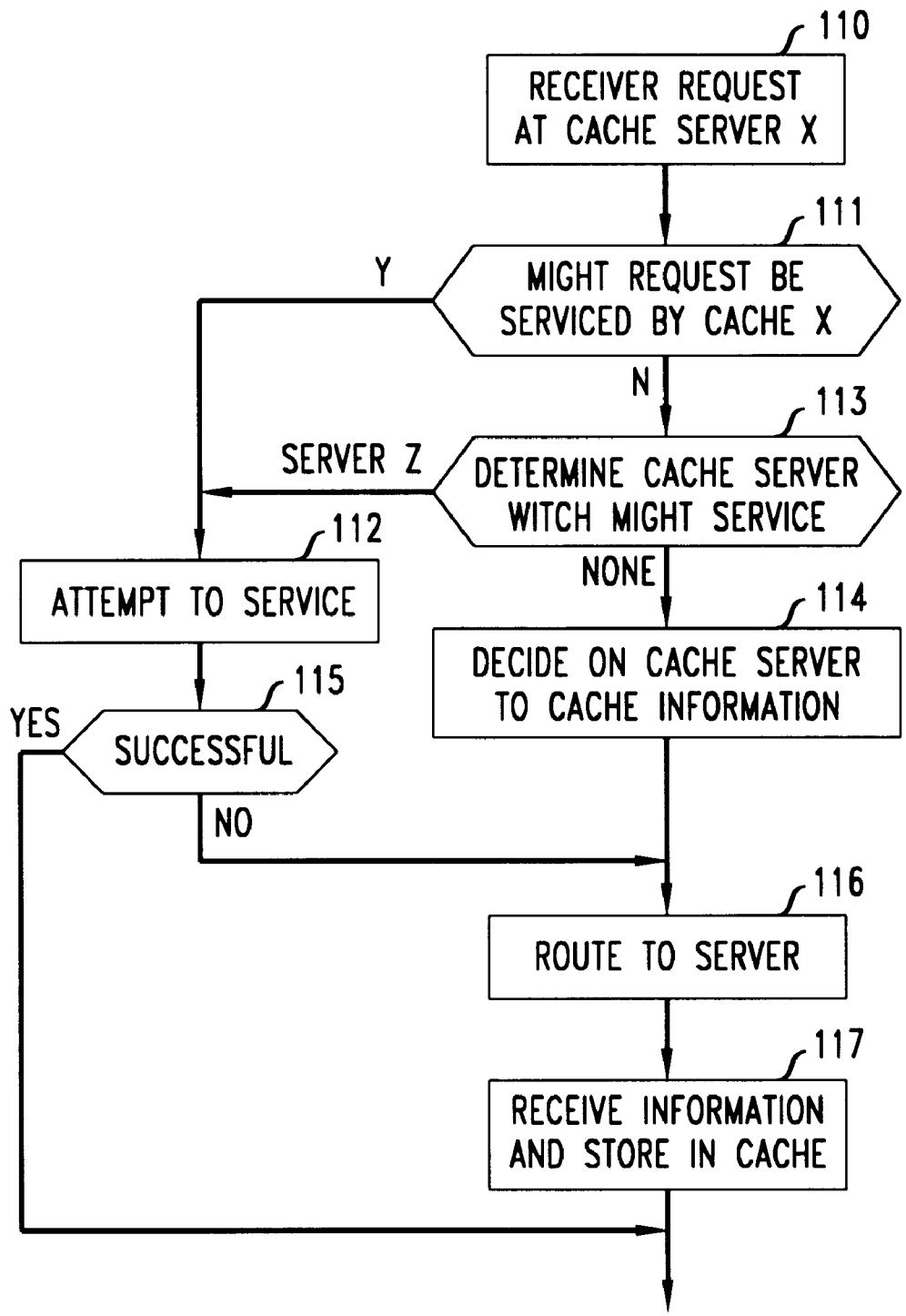
FIG. 3 depicts a flow diagram of the process carried out in the virtual cache server.

The basic methodology, depicted in FIG. 3, is one where a request comes into the virtual cache, and more specifically to some cache in the plurality of cache server (block 110). A determination is made in block 111 whether the request can be serviced by the cache server that received the request from the Internet. If so, control passes to block 112. Otherwise, control passes to block 113 which determines which, if any of the other cache servers might service the request. When such a server is identified, control passes to block 112. Otherwise, control passes to block 114. When control passes to block 112, an attempt is made to satisfy the request. If that attempt is successful, the process terminates. Otherwise, block 115 passes control to block 116 which routes the request to the site address contained in the request, and passes control to block 117. When control passes to block 114, a decision is made in block 114 as to which of the cache servers will cache information from the site identified in the request, and control passes to block 116. When block 116 routes the request to the site address identified in the request, control passes to block 117, where the request is satisfied and the information responsive to the request is passed to the requestor via the virtual cache. Whereupon, the cache server designated for caching this information (whether by virtue of information identified in blocks 111, 113, or 114) stores the information for future use.

In one embodiment comporting with the principles disclosed herein, each server in the virtual cache maintains a routing table, such as routing table 101 which is associated in FIG. 1 with server 10. The routing table specifies the sites that are cached by each server in the collection of servers that make up the virtual cache. As depicted in FIG. 1, table 101 is very simple, containing only two columns. The first column identifies a site, and the second column identifies the server that caches data from that site. Thus, this table is site-based, rather than object-based. Being more granular than an object-based table, this table requires fewer entries.

When Internet user 201 is routed to virtual cache 250, the request is actually routed to a particular server within the virtual cache, such as server 10. Server 10 first consults its table 101 to determine whether it serves as the cache server for the site from which an object is sought. If so, it searches to find the requested object. This search can of the objects themselves, or of an index, or table, that is object-based. If the object is found, the request is serviced. If not, the request is routed to the site where the object resides, e.g., site 301. If the desired site is found in table 101 but the indication is that another server caches that site, for example, server 11, then the request is routed to the server identified in the table, and that server attempts to satisfy the request, if it can. If it cannot satisfy the request because the particular object that is requested has not been requested before, and is, therefore, not found in the object-based table of server 11, then the server routes the request to the source itself (again, e.g., site 301), and the source site satisfies the request. While the requested object passes through the server that is responsible for caching the site, e.g., server 11 in the above example, that server captures the passing object, caches it for future requests, and places an appropriate entry in its object-based table.

The placement policy, which translates to, or fashions, the contents of the routing tables, can differ from embodiment to embodiment. The key is that the policy is cooperative, in that the servers co-operate over cache placement as well as cache resolution.

One policy is to simply assign all of the sites in sub-net 300 to different ones of the servers in virtual cache 250. The routing tables of all servers in the virtual cache would identically contain the assignment of sites. When the number of sites in sub-net 300 is reasonably small, that may be a perfectly viable approach. However, when that number is large, and when a large proportion of the sites is hardly ever accessed by users, then constructing a virtual cache with very large tables that need to be searched may present an unnecessary overhead. In some circumstances, therefore, an ad hoc may be better. In such an approach, whenever a request is received at a server, its associated site-based table is consulted, and if the site is not found, a decision is made regarding some server being the cache server for that site. One approach is to assign the site to the server that received the request. For example, assuming that server 13 receives a request that is destined to site 301. If, when searching through its table, server 13 fails to find an entry for site http://www.lucent.com, it concludes that the site has not been accessed before and, consequently, is not cached by any server. If server 301 has room (i.e., it has not exceeded some predetermined portion of its caching store or some predetermined number of cached sites) it assumes responsibility for caching site 301. Accordingly, server 13 adds site http://www.lucent.com to its search table and broadcasts this addition to the other servers. The other servers add the site to their search tables as well, thereby accomplishing the addition of a cached site.

Another approach for assigning responsibility for caching particular sites may be based on site proximity to the heavy users of the cached objects. For example, assuming that the FIG. 1 virtual cache handles all departments of a university, and that cache server 10 is close to the building which houses physics classes, cache server 11 is close to the building which houses psychology classes, cache server 12 is close to the building which houses engineering classes, and cache server 13 is close to the building which houses art classes department. Clearly, server 10 should cache physics related objects, which may be derived from different university Internet sites, server 11 should similarly cache psychology sites, etc. Such an assignment increases the likelihood that the first server that would be reached by the user would also be the site that caches the sought object.

In accordance with another embodiment, where both the search approach and the placement policy differ somewhat, all but one of the servers within virtual cache 250 are assigned specific sites to cache, while the remaining server is designated as the "catch-all", default, server. When a request comes in to a server in an arrangement that follows placement policy B, the associated table is consulted, and if the desired site is found in the table, the request is routed (if necessary) to the appropriate server. Otherwise, the request is routed to the default server. The default server consults its own site-based table (which need not shared with the other servers) to determine whether it caches the desired sites. If so, it services the request (by searching through its object-based table, etc.). Otherwise, it routes the request to the specified source.

The placement policy for this embodiment needs to identify those sites that are accessed often and those that are not. This is accomplished through cooperation between the servers. For example, each server can initially acquire sites that it caches in accordance with the ad hoc approach described above. Once a predetermined limit of sites is reached, the server refuses additional sites, and suggests to other servers to assume responsibility for caching additional sites. When all servers reach their predetermined limit, the default site assumes responsibility for caching additional sites. Thereafter, all servers maintain a log on how often their cache is accessed and how much storage they are devoting to caching objects. When a site that is cached by a non-default server is accessed less often than a site on the default server, the assignments are reversed. Or, when a server becomes too busy and is forced to shed a site, another server in the virtual cache needs to pick up the assignment of caching the deleted site. These tasks arc part of the general load balancing that needs to take account of how often a cache is accessed and how much memory is occupied with cached objects.

Since only sites that are heavily used are admitted to the non-default servers, the result is a much-reduced site-based table and, consequently, a faster average cache response. The faster average response results from the fact that the sites that are most often requested are cached in servers other than the default server. Finding the proper cache server by looking through the shorter site-based table takes less time.

The above-disclosed embodiments all have look-up tables; but look-up tables are not required. For example, the requested site can actually define the server that would cache it. Such defining can be accomplished by employing a hash function. A hash function is a function that maps a signal, such as an input string or a number, to one of M values. The hash function selected for the FIG. 1 arrangement would be one where M=4 because there are four cache servers in the virtual cache. Applying the destination site to the hash function would yield one of 4 values, and the value thus obtained defines the server that is responsible for caching the desired site. Of course, as in the above embodiments, the particular desired object might not be found in the server's cache store (e.g., hard drive).

It may be noted in passing that the disclosed approach is insensitive to whether a request comes to a cache server from outside the server, or from another cache server within virtual server 250.

The above discussion disclosed the principles of this invention, and a skilled artisan can implement those principles with the help of any of the various software packages that are publicly available. For sake of completeness, however, the following presents one illustrative implementation based on the Apache cache server.

Apache is currently the most widely used Web server software on the Internet, and its design has a highly modular structure which makes adding new components to it easier. See R. Thau, *Design considerations for the Apache Server API*, 5th International World Wide Web Conference, Paris, France, May 1996. This software can be downloaded from http://www.apache.org/.

A cache resolution/search and cache placement protocol in accordance with the principles disclosed herein can be implemented with a simple modification to the user request processing module. The current processing of a user request in Apache software is as follows:

check cache
    if object found
        return object to user
    else
        if remote proxy configured
            forward the request to the remote proxy
        else
            fetch directly from Web site
        end
        return object to user update cache
    end Since Apache allows a static remote proxy to be configured, one can simply replace the remote proxy with a dynamic one, returned by a cache routing table lookup. The other modification relates to the fact that in the Apache software the server only caches objects from Web sites it is responsible for. Accordingly, the modified processing module is as follows:

check cache
    if object found
        return object to user
    else
        check cache the site-based routing table
        if cache server found and is not itself
            forward the request to the cache server
        else
            fetch directly from Web site
            update cache
        end
        return object to user
    end The processing of requests forwarded by another cache server is slightly different from that of requests directly from users:

check cache
    if object found
        return object to originated cache server
    else
        fetch directly from Web site
        return object to originated cache server
        update cache
    end The communication between servers can be implemented in various ways, but I found that the Cache Information Exchange Protocol (CIEP) is quite acceptable. CIEP is currently implemented over TCP, but it need not be limited to TCP. Each CIEP packet contains a header, and cache routing entries. The header contains an opcode, a version number, a packet length field, a sequence number, and a sender host address. Currently, the following opcodes are defined:

CIEP_ADD: An announcement for new cache routing entries. Upon receiving a

CIEP_ADD packet, a server may add the new cache routing entries in its cache routing table.

CIEP_DELETE: An announcement for deleted cache routing entries. Upon receiving a CIEP_DELETE packet, a cache server must delete the entries from its cache routing table.

CIEP_FULL: A request for the entire current valid cache routing entries. Upon receiving a CIEP_FULL packet, a cache server should return a CIEP_ADD packet with all valid entries it is responsible for.

CIEP_OVERLOAD: When a cache server experiences overload for particular Web sites, it may send a CIEP_OVERLOAD packet. Upon receiving the packet, other cache servers may use local private cache to reduce the load.

The above discussion covered the question of site assignment to the cache server. However, that does not explicitly cover the question of how to add a server to the virtual cache, for example, after being off line for a while. When such a server first starts up, it has to establish an initial cache routing table. It may send CIEP_FULL packets to other servers to retrieve existing cache routing table. The server may also choose the Web sites for which it wants to become the designated cache server by configuration or/and by learning from access patterns. When a server is started, a list of Web sites can be supplied as parameters. The list may be derived from the logs of previous cache servers or based on human input. Alternatively, a server may enter a learning mode, gradually adding cache routing entries as it gathers request statistics.

It is possible under certain site placement policies for a number of cache servers to choose the same Web sites simultaneously. This can happen, for example, when some Web site is not in the cache routing table but suddenly become very popular, triggered by a synchronizing event such as email announcements to large mailing lists. Several cache servers may see a sudden increase in requests for a particular Web site, and start to send CEIP_ADD packets. To avoid such collision, all CEIP_ADD and CEIP_DELETE packets can be sent after a randomized delay period between 0–30 seconds.

There are, of course other ways to control the load balancing interactions between the servers. For example, although all of the servers are hierarchically equal, one of the servers can be in possession of a token which makes that server slightly "more equal". At regular intervals the servers communicate with a server that possesses the token, and that server determine whether, for the sake of load balancing, a given server must, for example, relinquish responsibility, and another server must assume responsibility, for caching a given site.

In addition to all of the above, a cache server may have a local private cache that is not visible to the virtual cache per se. In arrangements where a private cache is permitted, when a Web site is not found in the cache routing table, and there is no designated default server, the cache server has two options after fetching the requested object directly from the source Web site. It can cache the object and make it public, or it can simply put in its private cache. Even when a Web site has an entry in the cache routing table, a cache server may decide to privately cache some objects from that Web sites for certain reasons. For example, private cache may be used when the designated cache server becomes overloaded or when some Web sites require special treatment. The policies on the use of private cache are entirely local to the cache server involved.

The above disclosure of various embodiments is illustrative of the principles of this invention, but it should be noted that various modifications can be incorporated without departing from the spirit and scope of this invention. For example, whereas the routing tables disclosed above are site-based, one can easily envision arrangements where some site is divided into sub-sites (for example, because of the popularity of the site), and the routing table would be permitted to specify sub-sites.

I claim:

1. An arrangement including a plurality of interconnected cache servers, where at least some of the cache servers are connected to a data network, the arrangement comprising:

a cache selection module in each of said cache servers that, in response to receiving a request from a client for information from any one of multiple web sites, makes a determination, without consultation with other cache servers of said plurality of cache servers at the time said request arrives at said module, whether an attempt to service said request should be made a) at a specific one of said cache servers belonging to a set that includes said cache server of said module, or b) by servers outside said arrangement.

2. The arrangement of claim 1 where and said cache selection module makes its determination as to whether said request might be served by a specific one of said cache servers by first determining whether said request for information might be served by the cache server of said module, and when a determination is made that said request cannot be served by the cache server of said module, then by determining whether said request might be served by a specific other one of said plurality of cache servers.

3. The arrangement of claim 1 where said cache selection module makes its determination as to whether said request might be served by a specific one of said cache servers by determining whether said request for information might be served by the cache server of said module, or by a specific one of said plurality of cache servers.

4. The claim 1 where said set includes a pre-designated one of said cache servers as a default cache server, and said cache selection module makes its determination as to whether said request might be served by a specific one of said cache servers by determining whether said request for information might be served by the cache server of said module, then, if necessary, whether said request might be served by a specific one of said plurality of cache servers, then, if necessary, whether said request might be served by said default cache server.

5. The arrangement of claim 1 where said cache selection module makes its determination by consulting a table.

6. The arrangement of claim 5 where said table associates site specifications with the cache servers in said plurality of cache servers.

7. The arrangement of claim 5 where said table associates site or sub-site specifications, inclusively, with the cache servers in said plurality of cache servers.

8. The arrangement of claim 5 where said table effectively includes an entry for specifying a default cache server.

9. The arrangement of claim 1 where said cache selection module makes its determination by analyzing said request for information.

10. The arrangement of claim 9 said analyzing performs a transformation of said request for information.

11. The arrangement of claim 10 wherein said transformation is performed by means of a hash function applied to said request for information.

12. The arrangement of claim 1 where said cache selection module makes its determination by analyzing a site, or sub-site, specification contained in said request.

13. The arrangement of claims 12 said analyzing performs a transformation of said site, or sub-site, specification.

14. The arrangement of claim 13 wherein said transformation is performed by means of a hash function applied to said site, or sub-site, specification.

15. The arrangement of claim 1 further comprising an information-caching module in each of said cache servers, where said information-caching module decides whether to cache information of a given site in its cache server and operates accordance with an algorithm that comports with said determination made by said cache selection module, achieving thereby a conformance that a given cache which is determined by said cache selection module to be the cache server that might service a request for information from some specified site, is also the cache server selected by said information-caching module for caching information from said some specified site.

16. The apparatus of claim 15 where said information-caching module selects a cache server for caching information from a particular site, or sub-site, based on the address of said site.

17. The apparatus of claim 15 where said information-caching module selects a cache server for caching information from a particular site, or sub-site, based proximity of the selected cache server to a community of users.

18. The apparatus of claim 15 where said information-caching module selects a cache server for caching information from a particular site, or sub-site, based on physical locations of said cache servers.

19. The apparatus of claim 15 where said information-caching module selects a cache server for caching information from a particular site, or sub-site, based a prearranged algorithm.

20. The apparatus of claim 15 where said information-caching module selects a cache server for caching information from a particular site, or sub-site, based on spare capacity of the selected cache server compared to spare capacity of unselected cache servers of said plurality of cache servers.

21. The apparatus of claim 15 where said information-caching module selects its own cache server for caching information.

22. The apparatus of claim 15 where said information-caching module selects a default cache server for caching information.

23. The arrangement of claim 1, at least some of said cache servers further comprising a local cache for servicing requests for information received directly from said data network.

24. The arrangement of claim 1 where at least some of said cache servers further comprise a local cache which is accessed, in response to a request for information that arrives directly from said data network, before said cache selection module is accessed.

25. In an arrangement including a plurality of cache servers interconnected to form a virtual cache, a method for retrieving information from said virtual cache comprising the steps of:

receiving at one of said cache servers a request for information which specifies an address of one of multiple sites, or a sub-site of said one of multiple sites, which address designates the source of said information;

converting said address destination to a designation that identifies a cache server in said virtual cache; and directing said request for information to the identified cache server.

26. The method of claim 25 where said step of converting comprises obtaining a cache server designation from a table.

27. The method of claim 25 where said step of converting comprises performing a transformation of said site, or sub-site, address to obtain a cache server designation.

28. In an arrangement including a plurality of cache servers interconnected to form a virtual cache, a method for caching information in said virtual cache, comprising the steps of:

receiving a request for information which specifies one of multiple sites, or a sub-site of said one of multiple sites, address that designates the source of said information;

evaluating whether said request can be serviced by said virtual cache, when said step of evaluating determines that said virtual cache cannot service said request, routing said request to said one of multiple sites, or said sub-site address, receiving information responsive to said request for information; and based on address granularity no finer than sub-site address, assigning one of said servers to cache said information.

29. The method of claim 28 where said assigning is based on a transformation of said site, or sub-site, address.

30. The method of claim 28 where said assigning is to a specific one of said cache servers that is designated a default cache server.

31. The method of claim 28 where said assigning is based on spare capacity that is available at the cache servers.

32. The method of claim 28 where said assigning is based physical locations of said cache servers.

* * * * *

(12) EX PARTE REEXAMINATION CERTIFICATE (8256th)
United States Patent
Wang

(10) Number: US 6,112,279 C1
(45) Certificate Issued: May 24, 2011

(54) VIRTUAL WEB CACHING SYSTEM

(75) Inventor: Zheng Wang, Middletown, NJ (US)

(73) Assignee: Lucent Technologies Inc., Murray Hill, NJ (US)

Reexamination Request:
No. 90/010,947, Apr. 20, 2010

Reexamination Certificate for:
Patent No.: 6,112,279
Issued: Aug. 29, 2000
Appl. No.: 09/052,284
Filed: Mar. 31, 1998

(51) Int. Cl.
*G06F 12/08* (2006.01)
*G06F 17/30* (2006.01)

(52) U.S. Cl. .................. 711/119; 707/E17.12; 709/203; 709/219; 711/3; 711/E12.025

(58) Field of Classification Search .................... None
See application file for complete search history.

(56) References Cited

U.S. PATENT DOCUMENTS 5,787,470 A    7/1998   DeSimone et al.

OTHER PUBLICATIONS

Microsoft Proxy Server, White Paper, 1997.
Valloppillil et al, "Cache Array Routing Protocol v1.0," Internet–Draft, Jun. 30, 1997.
Valloppillil et al, "Hierarchical HTTP Routing Protocol," Internet–Draft, Apr. 21, 1997.
Oguchi et al, "A Study of Caching Proxy Mechanisms Realized on Wide Area Distributed Networks," in the Proceedings of HPDC–5, IEEE, 1996.
Malpani et al, "Making World Wide Web Caching Servers Cooperate," Dec. 1995.
Sharp Corporation, "Super Proxy Script: How to Make Distributed Proxy Servers by URL Hashing" originally published at http://naragw.sharp.co.jp/sps/, copy reproduced from the Web Archive, dated Nov. 22, 1996.
Gadde et al, "Reduce, Reuse, Recycle: An Approach to Building Large Internet Caches," Jan. 16, 1997.
Gadde et al, "Directory Structures for Scalable Internet Caches," Department of Computer Science, Duke University, Nov. 1997.
Wang et al, "Cachemesh: A Distributed Cache System for World Wide Web," Department of Computer Science, University College London, published Jun. 9–10, 1997.
Ross, "Hash–Routing for Collections of Shared Web Caches," Sep. 1997.
Netscape, "Navigator Proxy Auto–Config File Format," Mar. 1996.
Smith, "What Can Archives offer the World Wide Web?," Mar. 22, 1994.
Dahlin et al, "Cooperative Caching: Using Remote Client Memory to Improve File System Performance," Proceedings of the First Symposium on Operating Systems Design and Implementation, OSDI, 1994.
Cormack, "Caching on JANET," JISC Technical Report Sep. 1, 1996.

*Primary Examiner*—Alexander J Kosowski

(57) ABSTRACT

In an arrangement where a plurality of cache servers are interconnected to form a virtual cache, each cache server includes a selection module and a caching module. The selection module determines whether the cache server can service an incoming request for information, whether the request ought to be directed to another one of the cache servers, or whether the request be routed to the site from whence the information is requested. In making this determination, in accordance with one embodiment, the module consults a table that associates sites or/and sub-sites with specific ones of the cache servers. In another embodiment, the determination is made by translating the address of the site, or sub-site, or web page that is requested; for example, with a hash function. The caching module determines whether a request for information from a particular site will be cached in the cache server of the caching module, if it is not already being cached by one of the cache servers. The determinations made by the caching module comport with the determinations made by the selection module.

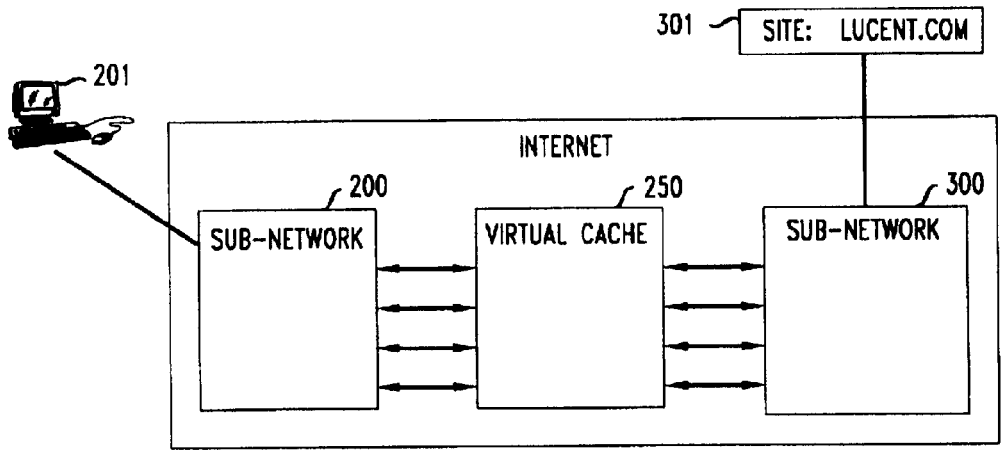

US 6,112,279 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25-31 is confirmed.

Claims 9 and 10 are cancelled.

Claims 1, 11-13, 15 and 32 are determined to be patentable as amended.

Claims 2-8, 14 and 16-24, dependent on an amended claim, are determined to be patentable.

New claims 33-93 are added and determined to be patentable.

1. An arrangement including a plurality of interconnected cache servers, where at least some of the cache servers are connected to a data network, the arrangement comprising:
   a cache selection module in each of said cache servers that, in response to receiving a request from a client for information from any one of multiple web sites, makes a determination without consultation with other cache servers of said plurality of cache servers at the time said request arrives at said module, whether an attempt to service said request should be made a) at a specific one of said cache servers belonging to a set that includes said cache server of said module, or b) by servers outside said arrangement, *where said cache selection module makes its determination by analyzing said request for information, said analyzing performing a transformation of said request for information.*

11. The arrangement of claim [10] *1* wherein said transformation is performed by means of a hash function applied to said request for information.

12. The arrangement of claim 1 [where said cache selection module makes its determination by] *wherein said analyzing* includes analyzing a site, or sub-site, specification contained in said request.

13. The arrangement of [claims] *claim* 12 wherein said analyzing [performs] *of said site or subsite includes* a transformation of said site, or sub-site, specification.

15. [The arrangement of claim 1 further comprising] *An arrangement including a plurality of interconnected cache servers, where at least some of the cache servers are connected to a data network, the arrangement comprising:*
   *a cache selection module in each of said cache servers that, in response to receiving a request from a client for information from any one of multiple web sites, makes a determination without consultation with other cache servers of said plurality of cache servers at the time said request arrives at said module, whether an attempt to service said request should be made a) at a specific one of said cache servers belonging to a set that includes said cache server of said module, or b) by servers outside said arrangement; and*
   *an information-caching module in each of said cache servers, where said information-caching module decides whether to cache information of a given site in its cache server and operates in accordance with an algorithm that comports with said determination made by said cache selection module, achieving thereby a conformance that a given cache which is determined by said cache selection module to be the cache server that might service a request for information from some specified site, is also the cache server selected by said information-caching module for caching information from said some specified site.*

32. The method of claim 28 where said assigning is based physical locations of said cache servers *based on proximity of the selected cache server to a community of users.*

*33. The method of claim 25, wherein said step of converting comprises determining a cache server according to a placement policy.*

*34. The method of claim 25, wherein said step of converting comprises determining a cache server according to a lookup table populated according to a placement policy.*

*35. The method of claim 25, wherein said step of converting comprises determining a cache server according to a hash table formed according to a placement policy.*

*36. The method of claim 33, wherein the placement policy provides cache assignment decisions.*

*37. The method of claim 36, wherein said cache assignment decisions are retrieved using a lookup table.*

*38. The method of claim 36, wherein said cache assignment decisions are retrieved using a hash table.*

*39. The method of claim 38, wherein said step of converting comprises applying said address information to a hash function to yield thereby a result associated with a cache server.*

*40. The method of claim 36, wherein the assignment decisions by the placement policy are made using a cache server loading information.*

*41. The method of claim 40, wherein the assignment decisions are adapted by the placement policy in response to changes in said cache server loading information.*

*42. The method of claim 36, wherein the assignment decisions by the placement policy are made using loading information associated with one or more cache servers.*

*43. The method of claim 42, wherein the assignment decisions are adapted by the placement policy in response to changes in said cache server loading information.*

*44. The method of claim 36, wherein said assignment decisions by the placement policy are made using cache server proximity to users of information.*

*45. The method of claim 44, wherein the assignment decisions are adapted by the placement policy in response to changes in said cache server proximity to users of information.*

*46. The method of claim 25, wherein said step of directing comprises sending the request to the identified cache server.*

*47. The method of claim 33, wherein each of said cache servers utilize said placement policy to cooperatively adapt information storage across said cache servers.*

*48. The method of claim 47, wherein said information storage is adapted to provide a load balancing of information stored across said cache servers.*

*49. The method of claim 48, wherein said load balancing is directed to distributing acrosss said cache servers a storage load associated with said stored information.*

*50. The method of claim 48, wherein said load balancing is directed to distributing across said cache servers a processing load associated with said stored information.*

51. The method of claim 47, wherein said information storage is adapted in response to cache server access frequency.

52. The method of claim 47, wherein said information storage is adapted in response to cache server location.

53. The method of claim 47, wherein said information storage is adpated in response to information request frequency.

54. The method of claim 47, wherein said placement policy causes a cache server receiving an information request to cache the requested information where the requested information is retrieved from a corresponding information source.

55. The method of claim 47, wherein said placement policy causes a cache server other than a cache server receiving an information request to cache the requested information where the requested information is retrieved from a corresponding information source.

56. The method of claim 55, wherein each of said cache servers is associated with a respective group of information source addresses, and wherein said placement policy causes each of said cache servers to cache requested information retrieved from a corresponding group of information source addresses.

57. The method of claim 56, wherein said information source addresses within a group comprise an address of one of multiple sites, or a sub-site of said one of multiple sites.

58. The arrangement of claim 1, wherein said step of determining comprises determining a cache server according to a placement policy.

59. The arrangement of claim 1, wherein said step of determining comprises determining a cache server according to a lookup table populated according to a placement policy.

60. The arrangement of claim 1, wherein said step of determining comprises determining a cache server according to a hash table formed according to a placement policy.

61. The arrangement of claim 58, wherein the placement policy provides cache assignment decisions.

62. The arrangement of claim 61, wherein said cache assignment decisions are retrieved using a lookup table.

63. The arrangement of claim 61, wherein said cache assignment decisions are retrieved using a hash table.

64. The arrangement of claim 63, wherein said step of determining comprises applying said address information to a hash function to yield thereby a result associated with a cache server.

65. The arrangement of claim 61, wherein the assignment decisions by the placement policy are made using a cache server loading information.

66. The arrangement of claim 65, wherein the assignment decisions are adapted by the placement policy in response to changes in said cache server loading information.

67. The arrangement of claim 61, wherein the assignment decisions by the placement policy are made using loading information associated with one or more cache servers.

68. The arrangement of claim 66, wherein the assignment decisions are adapted by the placement policy in response to changes in said cache server loading information.

69. The arrangement of claim 61, wherein said assignment decisions by the placement policy are made using cache server proximity to users of information.

70. The arrangement of claim 69, wherein the assignment decisions are adapted by the placement policy in response to changes in said cache server proximity to users of information.

71. The arrangement of claim 58, wherein each of said cache servers utilize said placement policy to cooperatively adapt information storage across said cache servers.

72. The arrangement of claim 71, wherein said information storage is adapted to provide a load balancing of information stored across said cache servers.

73. The arrangement of claim 72, wherein said load balancing is directed to distributing across said cache servers a storage load associated with said stored information.

74. The arrangement of claim 75, wherein said load balancing is directed to distributing across said cache servers a processing load associated with said stored information.

75. The arrangement of claim 71, wherein said information storage is adapted in response to cache server access frequency.

76. The method of claim 71, wherein said information storage is adapted to response to cache server location.

77. The arrangement of claim 71, wherein said information storage is adapted in response to information request frequency.

78. The arrangement of claim 71, wherein said placement policy causes a cache server receiving an information request to cache the requested information where the requested information is retrieved from a corresponding information source.

79. The arrangement of claim 71, wherein said placement policy causes a cache server other than a cache server receiving an information request to cache the requested information where the requested information is retrieved from a corresponding information source.

80. The arrangement of claim 79, wherein each of said cache servers is associated with a respective group of information source addresses, and wherein said placement policy causes each of said cache servers to cache requested information retrieved from a corresponding group of information source addresses.

81. The arrangement of claim 80, wherein said information source addresses within a group comprise an address of one of multiple sites, or a sub-site of said one of multiple sites.

82. The arrangement of claim 1, wherein each of said cache servers utilize a placement policy to cooperatively adapt information storage across said cache servers.

83. The arrangement of claim 82, wherein said information storage is adapted to provide a load balancing of information stored across said cache servers.

84. The arrangement of claim 83, wherein said load balancing is directed to distributing across said cache servers a storage load associated with said stored information.

85. The arrangement of claim 83, wherein said load balancing is directed to distributing across said cache servers a processing load associated with said stored information.

86. The arrangement of claim 82, wherein said information storage is adapted to response to cache server access frequency.

87. The arrangement of claim 82, wherein said information storage is adapted in response to cache server location.

88. The arrangement of claim 82, wherein said information storage is adapted in response to information request frequency.

89. The arrangement of claim 82, wherein said placement policy causes a cache server receiving an information request to cache the requested information where the requested information is retrieved from a corresponding information source.

90. The arrangement of claim 82, wherein said placement policy causes a cache server other than a cache server receiving an information request to cache the requested information where the requested informatoin is retrieved from a corresponding information source.

91. The arrangement of claim 90, wherein each of said cache servers is associated with a respective group of information source addresses, and wherein said placement policy causes each of said cache servers to cache requested information retrieved from a corresponding group of information source addresses.

92. The arrangement of claim 91, wherein said information source addresses within a group comprise an address of one of multiple sites, or a sub-site of said one of multiple sites.

93. The arrangement of claim 82, wherein said information storage is adapted in response to cache server access frequency.

* * * * *